United States Patent [19]

Brulard et al.

[11] 4,443,371
[45] Apr. 17, 1984

[54] TRISAZO BLACK DYES

[75] Inventors: Andre T. Brulard, Villerot; Andre A. Gerbaux, Baudour, both of Belgium

[73] Assignee: Althouse Tertre, S.A., Brussels, Belgium

[21] Appl. No.: 300,564

[22] Filed: Sep. 9, 1981

[30] Foreign Application Priority Data

Sep. 16, 1980 [BE] Belgium ............................... 202118

[51] Int. Cl.$^3$ ..................... C09B 35/37; D06P 1/39; D06P 3/32
[52] U.S. Cl. ........................ 260/169; 8/639; 8/641; 260/173; 260/198
[58] Field of Search ............. 260/169; 11/173; 8/639, 8/641

[56] References Cited

U.S. PATENT DOCUMENTS

| | | | |
|---|---|---|---|
| 1,877,800 | 9/1932 | Brightman | 260/173 |
| 2,112,919 | 4/1938 | Mendoza et al. | 260/173 |
| 2,885,391 | 5/1959 | Huss et al. | 260/173 X |
| 2,892,827 | 6/1959 | Nickel et al. | 260/173 X |
| 4,097,476 | 6/1978 | Wicki | 260/173 |

*Primary Examiner*—Floyd D. Higel
*Attorney, Agent, or Firm*—Synnestvedt & Lechner

[57] ABSTRACT

New trisazo dyes, having the structure

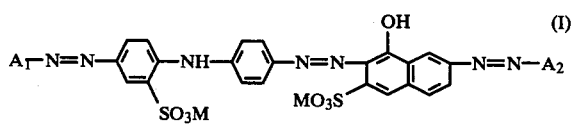

in which
M represents H, Na, K, Li, or N(R$_3$)H wherein R represents —H, —CH$_3$, —C$_2$H$_5$, —C$_3$H$_7$, —CH$_2$CH$_2$OH, —CH$_2$CH(OH)CH$_3$ or —CH$_2$CH$_2$OCH$_2$CH$_2$OH;

A$_1$ and A$_2$, which may be identical or different, represent the residual moiety of a coupling component which contains at least one amino group or one hydroxy group and wherein said coupling component has the following general structures II and III:

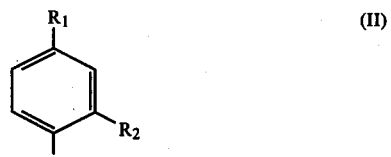

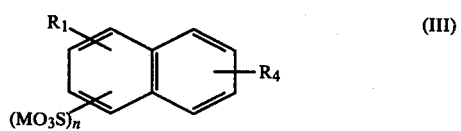

and in which
M has the above meanings;
R$_1$ represents —NH$_2$ or —OH;
R$_2$ represents —NH$_2$, —OH, —O—alkyl, —NHCO lower alkyl, —NH aryl, —NH lower alkyl, —N(lower alkyl)$_2$ and —NHCH$_2$COOM;
R$_3$ represents hydrogen, a lower alkyl or —SO$_3$M;
R$_4$ represents —H, —NH$_2$, —OH, —O—alkyl, —NHCO lower alkyl, —NH aryl, —NH lower alkyl and —NHCH$_2$COOM; and
n=0, 1 or 2.

They are useful for dyeing substrates which may be dyed by substantive dyes, particularly leather and paper.

12 Claims, No Drawings

TRISAZO BLACK DYES

This invention relates to new trisazo dyes, to the preparation thereof and to the use thereof for dyeing substrates which may be dyed by substantive dyes, particularly leather and paper.

More particularly, this invention relates to trisazo dyes of the following general structure (I):

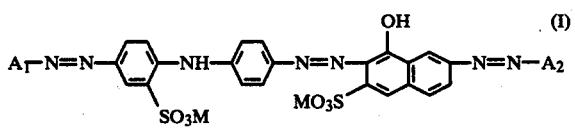

in which
M in formula I, and in all other structural formulae of this application, represents H, Na, K, Li, or $N(R_3)H$ wherein R represents —H, —$CH_3$, —$C_2H_5$, —$C_3H_7$, —$CH_2CH_2OH$, —$CH_2CH_2OH$, —$CH_2CH(OH)CH_3$ or —$CH_2CH_2OCH_2CH_2OH$;

$A_1$ and $A_2$, which may be identical or different, represent the residual moiety of a coupling component which contains at least one amino group or one hydroxy group and wherein said coupling component has the following general structures II and III:

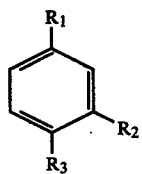

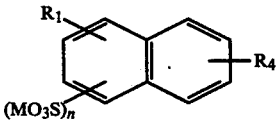

and in which
M has the above meanings;
$R_1$ represents —$NH_2$ or —OH;
$R_2$ represents —$NH_2$, —OH, —O—alkyl, —NHCO lower alkyl, —NH aryl, —NH lower alkyl, —N(-lower alkyl)$_2$ and —$NHCH_2COOM$;
$R_3$ represents hydrogen, a lower alkyl or —$SO_3M$;
$R_4$ represents —H, —$NH_2$, —OH, —O—alkyl, —NHCO lower alkyl, —NHCO lower alkyl, —NH aryl, —NH lower alkyl and —$NHCH_2$-COOM; and
n=0, 1 or 2.

Throughout this application the term lower alkyl refers to the $C_1$ to $C_4$ alkyls.

For preparing the dyes of general structure (I), according to this invention, the tetrazonium salt of a diamine of the following structure IV:

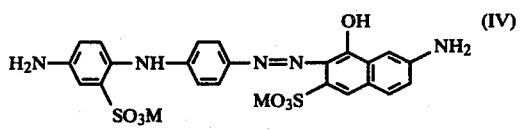

in which M has the above meanings, is coupled with a coupling component of the following structure V:

H—A   (V)

in which A has one of the above meanings of $A_1$ or $A_2$ in structure III, or with a mixture of said coupling components.

Suitable intermediate coupling components of formula V for use in accordance with this invention include, without limitation:
1,3-diaminobenzene
3-aminophenol
resorcinol
3-amino-phenylglycine
3-(N,N-dimethyl)-aminophenol
1,3-diamino-benzene-6-sulfonic acid
3-amino-5-methyl phenol
1-naphthol
2-naphthol
1-aminonaphthalene-6-sulfonic acid
1-aminonaphthalene-7-sulfonic acid
3-aminoacetanilide
3-methoxyphenol
3-acetaminophenol
3-aminodiphenylamine
3-(N-ethyl)-aminophenol
3-(N,N-diethyl)-aminophenol
2-hydroxynaphthalene-6-sulfonic acid
2-amino-8-hydroxynaphthalene-6-sulfonic acid
2-amino-5-hydroxynaphthalene-7-sulfonic acid
2-phenylamino-5-hydroxynaphthalene-7-sulfonic acid
2-(N-methylamino)-8-hydroxynaphthalene-6-sulfonic acid
2-(N-carboxymethylamino)-8-hydroxy-naphthalene-6-sulfonic acid
1-naphthylamine
2-acetylamino-5-hydroxynaphthalene-7-sulfonic acid
2,3-dihydroxynaphthalene-6-sulfonic acid
2-aminonaphthalene-6-sulfonic acid
2-aminonaphthalene-4,8-disulfonic acid
1-aminonaphthalene-4-sulfonic acid
2-hydroxynaphthalene-3,6-disulfonic acid
1-amino-8-hydroxynaphthalene-3,6-disulfonic acid
1-hydroxynaphthalene-4-sulfonic acid
2-aminonaphthalene-3,6-disulfonic acid As is well known to chemists experienced in the azo chemistry art, other coupling components having the structures II and III can be employed to provide the $A_1$ and $A_2$ substituents that are not specifically covered in the above enumerated list of coupling components.

The structure I compounds can be made as the free acid or as the sodium, potassium, lithium or —$N(R)_3H$ salt (in the latter case R represents the same substituent or different substituents selected from the following: H, —$CH_3$, —$C_2H_5$, —$C_3H_7$, —$CH_2CH_2OH$, —$CH_2C$-H(OH)CH_3$ or —$CH_2CH_2OCH_2CH_2OH$) by various well known techniques.

The tetrazotization of the diamine of structure IV and the coupling of the tetrazonium salt are effected by known methods. For example, the coupling can be made in an aqueous alkaline, neutral or acid medium. The compounds of structure I may then be separated by the usual methods.

For preparing the diamine of structure IV, a compound of structure VI:

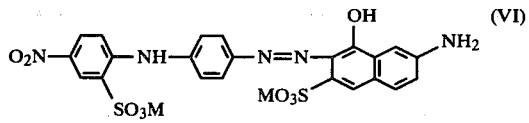

is reduced by known methods, for example in the presence of a weak reducing agent, such as sodium sulphide or sodium hydrosulfide.

The compounds of structure VI are prepared by diazotization of the 4-amino-4'-nitro-1,1'-diphenylamine-2'-sulfonic acid and coupling the diazonium salt to 2-amino-8-hydroxy-naphthalene-6-sulfonic acid in alkaline medium.

This invention also relates to the use of the structure I dyes for dyeing cellulosic fibers which may be dyed by substantive dyes, particularly paper and also to dye leather. Said dyes may be used alone or mixed with other dyes. They may be applied on a substrate by the usual methods, for example by dyeing according to the exhaustion method. Deep black shades from greenish black to reddish black are obtained having good fastness properties.

The compounds of structure I are easily soluble in water and are stable in the presence of acids. On leather and paper said compounds shown an optimum substantivity and a good dyeing yield, which are comparable to those of the C.I. Direct Black 38 without having the known disadvantages of this dye which is prepared from a carcinogenic intermediate.

The following examples illustrate this invention in a non-limiting manner. The parts and percentages are by weight and the temperatures are indicated in Centigrade degrees.

EXAMPLE 1

30.9 parts of 4'-nitro-4-amino-1,1'-diphenylamine-2'-sulfonic acid are diazotized by the usual methods with hydrochloric acid and sodium nitrite and the resulting diazo compound is coupled, at a pH higher than 9, with 23.9 parts of 2-amino-8-hydroxy-naphthalene-6-sulfonic acid, so as to obtain a nitroazo compound which is reduced by addition of 40 parts of a 60% sodium sulfide solution, at a temperature between 30° and 40°. The reduction product is separated by salting and lowering the pH to 1.5. The obtained diamino derivative is tetrazotized with 14.0 parts of sodium nitrite and coupled on 21.6 parts of 1,3-diamino-benzene in an alkaline medium. The desired dye is separated; it corresponds to the compound of the following structure:

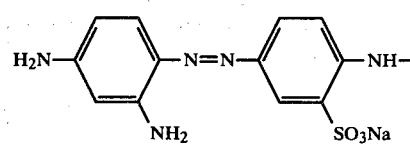 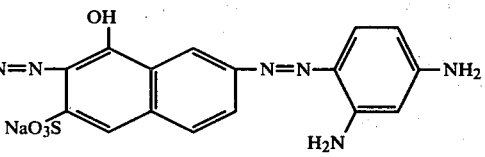

This compound gives a solid deep black shade on leather and paper.

EXAMPLES 2 TO 7

When the 21.6 parts of 1,3-diamino-benzene are replaced, in the method described in example 1, by equivalent amounts of the coupling component of the structure H—A dyes are obtained, which have the shades indicated in the following table:

| Ex. | H—A | Shade on leather |
| --- | --- | --- |
| 2 | 3-amino-phenol | reddish black |
| 3 | 1,3-diamino-6-sulfo-benzene | greenish black |
| 4 | 1,3-dihydroxy-benzene | reddish brown |
| 5 | m.amino-phenylglycine | violet black |
| 6 | β-naphthol | purple |
| 7 | 1-amino-6-sulfo-naphthalene | violet black |

EXAMPLE 8 TO 11

When the method of example 1 is used, except that the 21.6 parts of 1,3-diamino-benzene are replaced by an equivalent amount of one of the mixtures indicated below, mixtures of dyes are obtained, said mixtures having properties which are similar to those of the dye described in example 1.

| Ex. | Mixtures of coupling components | Shades on leather |
| --- | --- | --- |
| 8 | 1,3-diamino-benzene 3-N—N—dimethylaminophenol | orange black |
| 9 | 3-amino-phenol 1,3-diamino-6-sulfo-benzene | orange black |
| 10 | 1,3-diamino-6-sulfo-benzene 1,3-diamino-benzene | greenish black |
| 11 | m.amino-phenylglycine 3-amino-5-methyl-phenol | violet black |

EXAMPLE 12

100 parts of chromium box leather freshly neutralized was kneaded in a dyeing bath comprising 300 parts of water at 50° and 1 part of the dye of example 1. After 30 minutes of dyeing at 50°, 0.5 part of formic acid (85%) was added and the temperature was maintained at 50° during 20 minutes. The dyeing was finished in the usual manner and a leather of chromium box quality having a very uniform intense deep reddish black shade was obtained.

EXAMPLE 13

100 parts of rewetted vegetable tanned sheep skin were kneaded, for 30 minutes at 50°, in a vat containing a bath consisting of 1000 parts of water and 10 parts of the dye obtained in example 10. The dye was fixed by addition of 5 parts of a 85% solution of formic acid. A leather having a deep black shade was obtained.

EXAMPLE 14

In a bath consisting of 300 parts of water at 55° and 2 parts of ammonia, 100 parts of split suede was treated during 40 minutes with 1 part of the dye described in example 10. The dyeing bath was exhausted and the dye was fixed by addition of 0.7 part of a 85% solution of formic acid. After drying and rubbing of the velvet side, a black leather was obtained.

EXAMPLE 15

During 20 minutes, an amount of paper pulp corresponding to 100 parts of a 100% dry product, was mixed with 0.5 part of the dye of example 1 and 4 parts of resin soap. An amount of water was added so that the resulting volume corresponds to 6 times the volume of the used pulp, and 3 parts of aluminum sulfate were added. The pulp was then converted into paper. The so obtained paper had a neutral grey shade; it had good fastness properties and can be bleached with hypochlorite.

We claim:

1. A trisazo dye of the structure:

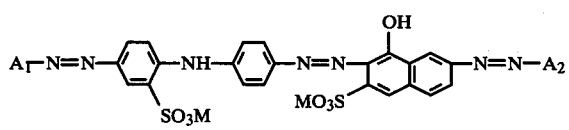

in which

M represents H, Na, K, Li, or $N(R)_3H$ wherein R represents H, $CH_3$, $C_2H_5$, $C_3N_7$, $-CH_2CH_3OH$, $-CH_2CH(OH)CH_3$ or $-CH_2CH_2OCH_2CH_2OH$;

$A_1$ and $A_2$, which may be identical or different, represent a coupling component which contains at least one amino group of a hydroxy group and has the structure:

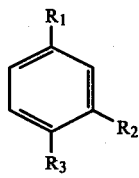

(where the azo linkage is other than meta to the $R_1$ and $R_2$ substituents) or

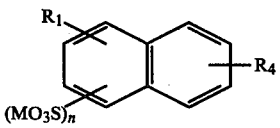

(where the azo linkage is ortho or para to the $R_1$ and $R_4$ substituents), and in which M has the above meaning;

$R_1$ represents $-NH_2$ or $-OH$;

$R_2$ represents $-NH_2$, $-OH$, $-O-$alkyl, $-NHCO$ lower alkyl, $-NH$ aryl, $-NH$ lower alkyl, $-N(-$lower alkyl$)_2$ and $-NHCH_2COOM$;

$R_3$ represents hydrogen, a lower alkyl or $SO_3M$;

$R_4$ represents $-H$, $-NH_2$, $-OH$, $-O-$alkyl, $-NHCO$ lower alkyl, $-NHCO$ lower alkyl, $-NH$ aryl, $-NH$ lower alkyl and $-NHCH_2$-$COOM$; and $n=0$, 1 or 2.

2. A compound according to claim 1 wherein the coupling component is 3-amino-phenol.

3. A compound according to claim 1 wherein the coupling component is 1,3-diamino-6-sulfo-benzene.

4. A compound according to claim 1 wherein the coupling component is 1,3-dihydroxy-benzene.

5. A compound according to claim 1 wherein the coupling component is m. amino-phenylglycine.

6. A compound according to claim 1 wherein the coupling component is $\beta$-naphthol.

7. A compound according to claim 1 wherein the coupling component is 1-amino-6-sulfo-naphthalene.

8. A compound according to claim 1 wherein the coupling component is a mixture of 1,3-diaminobenzene and 3-N-N-dimethylamino phenol.

9. A compound according to claim 1 wherein the coupling component is a mixture of 3-amino-phenol and 1,3-diamino-6-sulfo-benzene.

10. A compound according to claim 1 wherein the coupling component is a mixture of 1,3-diamino-6-sulfo-benzene and 1,3-diamino-benzene.

11. A compound according to claim 1 wherein the coupling component is a mixture of m. amino-phenylglycine and 3-amino-5-methyl-phenol.

12. A compound according to claim 1 having the structure:

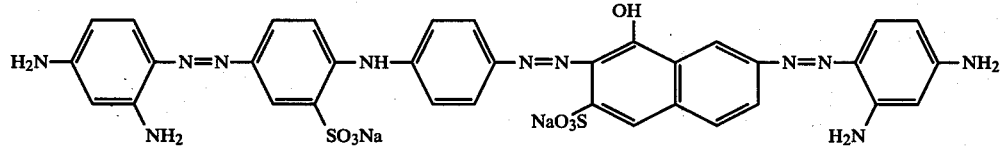

* * * * *